(12) United States Patent
Brahler

(10) Patent No.: US 6,443,657 B1
(45) Date of Patent: *Sep. 3, 2002

(54) METHOD OF INSTALLING OR REPLACING UNDERGROUND PIPE

(75) Inventor: Christian J. Brahler, Naperville, IL (US)

(73) Assignee: TT Technologies, Inc., Aurora, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/855,155

(22) Filed: May 13, 1997

Related U.S. Application Data

(63) Continuation of application No. 08/500,631, filed on Jul. 11, 1995, now abandoned.

(51) Int. Cl.⁷ ................................................. F16L 1/028
(52) U.S. Cl. ...................................... 405/154; 405/184
(58) Field of Search ............................... 405/154, 156, 405/168.3, 184, 169, 168.4; 138/97

(56) References Cited

U.S. PATENT DOCUMENTS

| | | |
|---|---|---|
| 2,027,063 A | 1/1936 | Reifel |
| 3,894,402 A | 7/1975 | Cherrington |
| 3,996,758 A | 12/1976 | Cherrington |
| 4,043,136 A | 8/1977 | Cherrington |
| 4,221,503 A | 9/1980 | Cherrington |
| 4,287,953 A | 9/1981 | Mazza |
| 4,453,603 A | 6/1984 | Voss et al. |
| 4,493,379 A | 1/1985 | Reichman et al. |
| 4,505,302 A | 3/1985 | Streatfield et al. |
| 4,507,019 A * | 3/1985 | Thompson .................. 405/154 |
| 4,637,756 A | 1/1987 | Boles |
| 4,720,211 A | 1/1988 | Streatfield et al. |
| 4,738,565 A | 4/1988 | Streatfield et al. |
| 4,789,268 A | 12/1988 | Yarnell |
| 5,282,696 A * | 2/1994 | Solomon et al. ............ 405/184 |
| 5,302,053 A * | 4/1994 | Moriarty ..................... 405/154 |
| 5,328,297 A * | 7/1994 | Handford .................... 405/184 |
| 5,375,945 A | 12/1994 | Cherrington |
| 5,403,120 A * | 4/1995 | Stekette, Jr. ................ 405/154 |
| 5,427,475 A * | 6/1995 | Coss .......................... 405/184 |
| 5,439,320 A * | 8/1995 | Abrams ...................... 405/154 |
| 5,452,967 A * | 9/1995 | Fuller ......................... 405/184 |
| RE35,271 E * | 6/1996 | Fisk et al. .................. 405/154 |

FOREIGN PATENT DOCUMENTS

WO    WO 92/13226    8/1992

OTHER PUBLICATIONS

Exhibit A: British Gas plc "Introducing Pipebursting" brochure (Jan. 1994).

* cited by examiner

*Primary Examiner*—Frank Tsay
(74) *Attorney, Agent, or Firm*—Schwegman, Lundberg, Woessner & Kluth, P.A.

(57) ABSTRACT

The present invention is directed toward a method for replacing or lining existing underground pipe. The present invention replaces the pipe between two manholes without the need to dig associated trenches. A diagonal pilot hole is formed by a piercing tool. A guide cable is passed through the existing pipe and pilot hole and attached to a ramming tool operative in bringing new pipe through the pilot hole, and into the existing pipe. The ramming tool bursts the existing pipe into the surrounding soil and replaces the existing pipe with the new pipe.

9 Claims, 6 Drawing Sheets

METHOD OF INSTALLING OR REPLACING UNDERGROUND PIPE

This is a Continuation of application Ser. No. 08/500,631, filed Jul. 11, 1995 now abandoned.

FIELD OF THE INVENTION

The present invention relates to replacement or rehabilitation of existing underground pipe.

BACKGROUND OF THE INVENTION

Underground pipes, such as gas, sewer or water mains periodically need replacement or rehabilitation due to leakage caused by cracks if increased service capacity is needed. Replacement or rehabilitation of underground pipes is traditionally cumbersome, in part, because often times the underground pipe must be unearthed for removal.

Methods and equipment have been developed which facilitate the replacement of underground pipe without the need to unearth the entire length of pipe. Such methods and apparatus are described in, for example, U.S. Pat. No. 4,789,268 to Yarnell and U.S. Pat. No. 4,738,565 to Streatfield. As best illustrated in FIG. 1, each of these methods involve digging trenches 14 and 15 on opposite sides of a section of pipe 16 which needs replacement. It is not uncommon for such trenches to be 10–30 feet deep in practice with lengths of 14 feet and widths of six feet or more. A frustro-conical section 10, having a constant tension guide cable 12 attached at one end, is passed through the section of pipe 16 being replaced. Guide cable 12 is also attached to a winch. Pipe 16 is cracked and/or fragmented with the fragments or pieces pushed into the surrounding earth, and a new plastic or flexible pipe 11 pulled into place. This process is commercially known as pipe bursting.

The operation extends from trench 14, to trench 15 and completely replaces the pipe therebetween. Each trench provides a location from which the pipe fracturing apparatus may be launched or inserted and then retrieved or removed. The methods and apparatuses of both U.S. Pat. No. 4,789,268 to Yarnell and U.S. Pat. No. 4,738,565 to Streatfield eliminate the need to completely dig up the old pipe in order to replace it. Because trenches 14 and 15 do not extend the length of pipe 16 this method is less expensive and less intrusive into the community served by the original pipe.

The "two trench" method illustrated in FIG. 1 may also be used to line old pipe 16 with a slip liner pipe. The plastic liner operates to prevent leakage but has the drawback that the repaired main typically has a decreased capacity. Because lining the pipe generally decreases the capacity of pipe 16, the above described method of replacement or pipe bursting is often preferred.

Despite the convenience of the prior art over digging the old pipe out, the prior art methods still involve a degree of intrusiveness to the community because of the two adjacent trenches. Therefore, a need has arisen to decrease the inconvenience of replacing or rehabilitating pipe.

SUMMARY OF THE INVENTION

The present invention relates to a method of replacing existing or relining underground pipe. The existing pipe is surrounded by soil and includes a lumen and an associated longitudinal axis. The method includes the steps of forming a diagonal pilot hole between the existing pipe and an upper ground surface, forcing a ramming and fracturing tool through the pilot hole and existing pipe, where the ramming and fracturing tool is operative in placing a new pipe having an associated longitudinal axis so that the associated longitudinal axis of the new pipe is substantially the same as the longitudinal axis of the existing pipe. The section of pipe to be replaced generally runs from manhole to manhole.

The method of the present invention may also include the step of passing a guide cable having a proximal end and a distal end through the existing pipe and pilot hole. The proximal end of the cable is attached to a winch, and the distal end of the cable is attached to the ramming tool, so that the guide cable guides the ramming tool through the existing pipe and maintains an assistive force to the tool to provide a constant pressure against the pipe to be broken. After the existing pipe has been replaced, the ramming tool and guide cable may be removed through a manhole.

BRIEF DESCRIPTION OF THE DRAWINGS

FIG. 7 is a side view of an alternate method of the present invention illustrating a diagonal entry pilot hole and a diagonal exit hole including a ramming tool position adjacent the entry pilot hole.

DESCRIPTION OF THE PREFERRED EMBODIMENT

The present invention is directed toward a method for replacing or lining existing underground pipe. The method generally eliminates the need to dig the pits or trenches 14 and 15 associated with the prior art. In particular, the present invention replaces the pipe between two manholes without the need to dig associated trenches. A diagonal pilot hole is formed by a piercing tool launched upwardly from the starting manhole. A guide cable or winch cable is passed through the existing pipe and pilot hole and attached to a ramming tool operative in bringing new pipe through the pilot hole, and into the existing pipe. In many cases, the launched piercing tool simultaneously pulls the guide cable while drilling the pilot hole.

The ramming or piercing tool starts its journey at ground level and bursts the existing pipe into the surrounding soil and replaces the existing pipe with the new pipe as it passes between the launching manhole and the ending manhole. It is understood that the present invention also includes the utilization of a pilot hole to line or slip line an existing pipe with a plastic liner or otherwise use this technique to repair, replace, or rehabilitate pipes.

Figure 2:
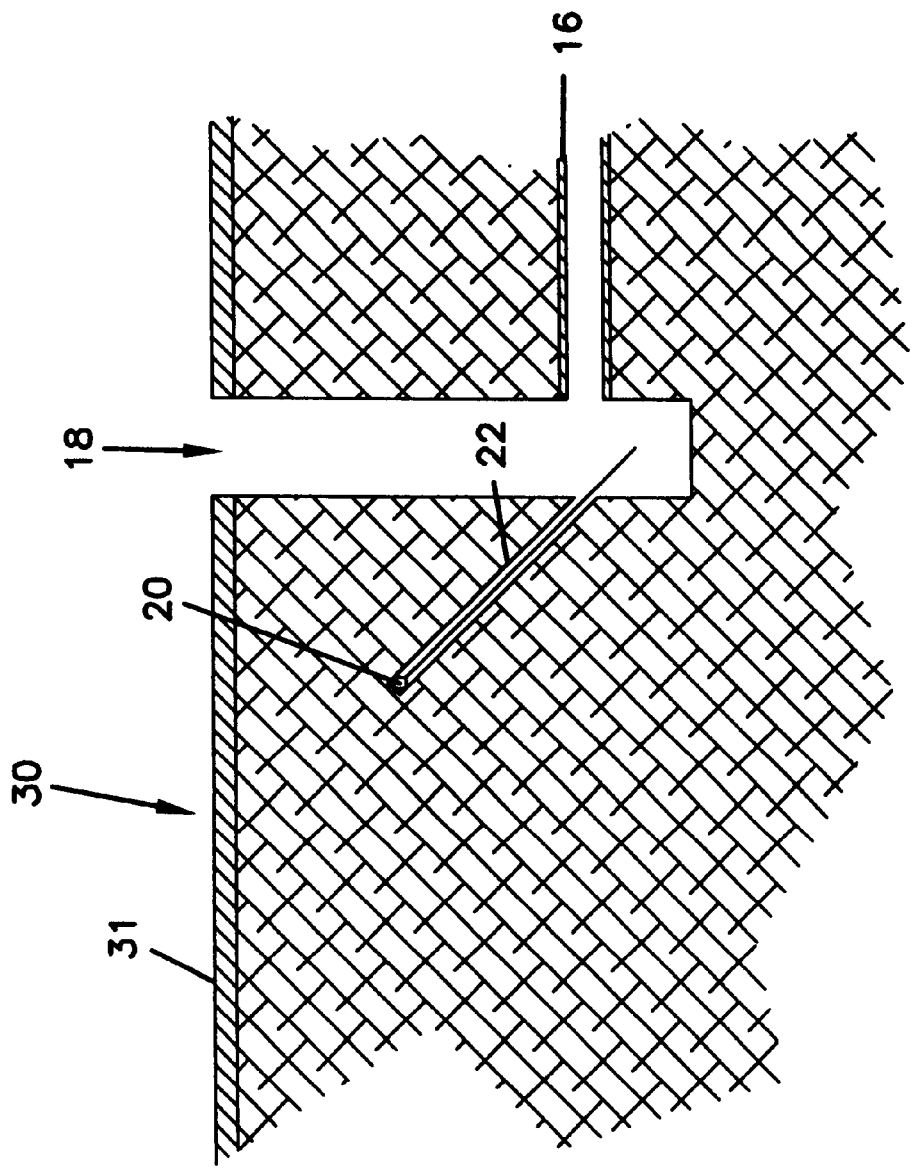
FIG. 2 is a side view of the method of the present invention specifically illustrating a piercing tool from a pilot hole with the soil shown in section.
Figure 3:
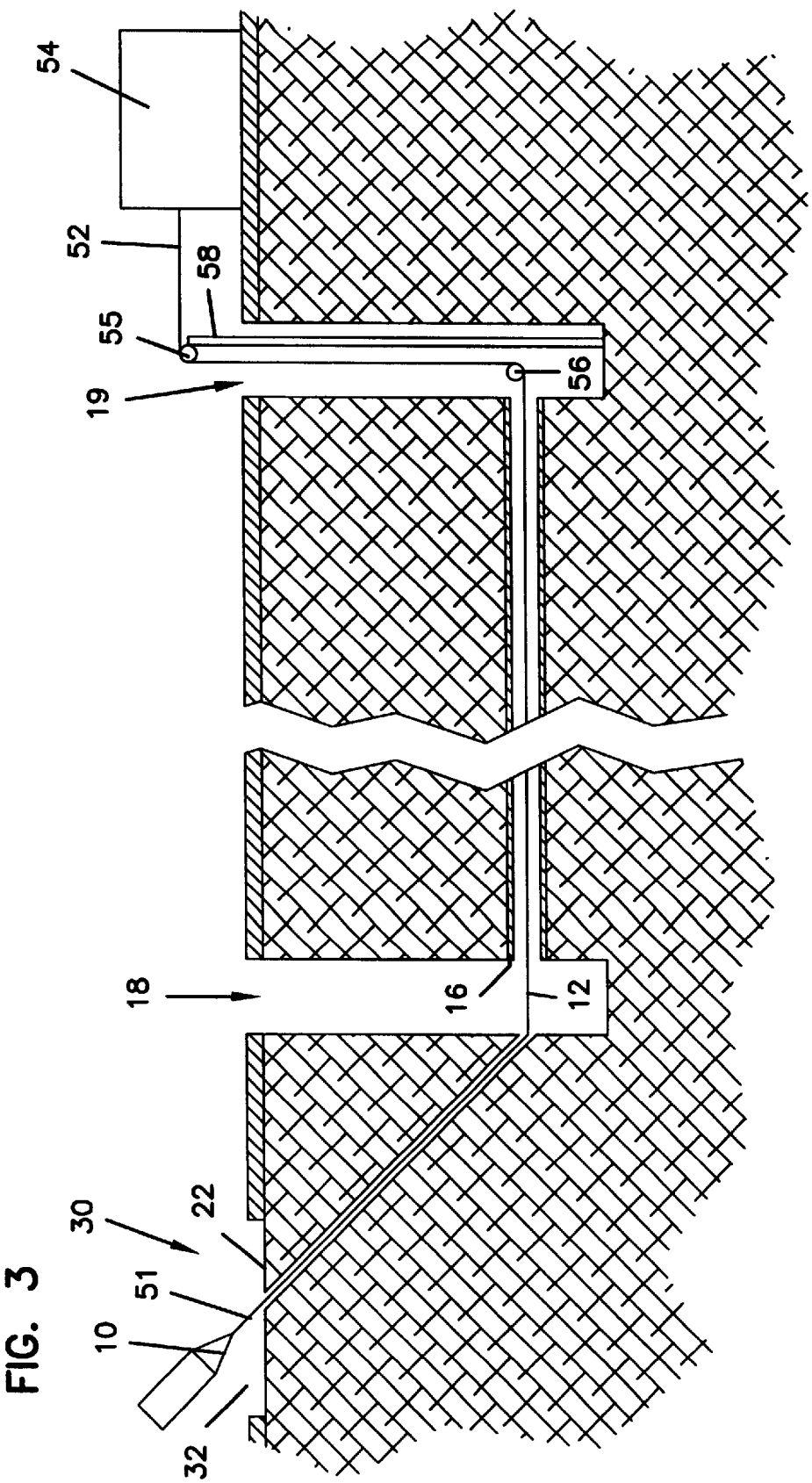
FIG. 3 is a similar side view of the method of the present invention specifically illustrating a complete pilot hole having a cable passing therethrough.
Figure 3A:
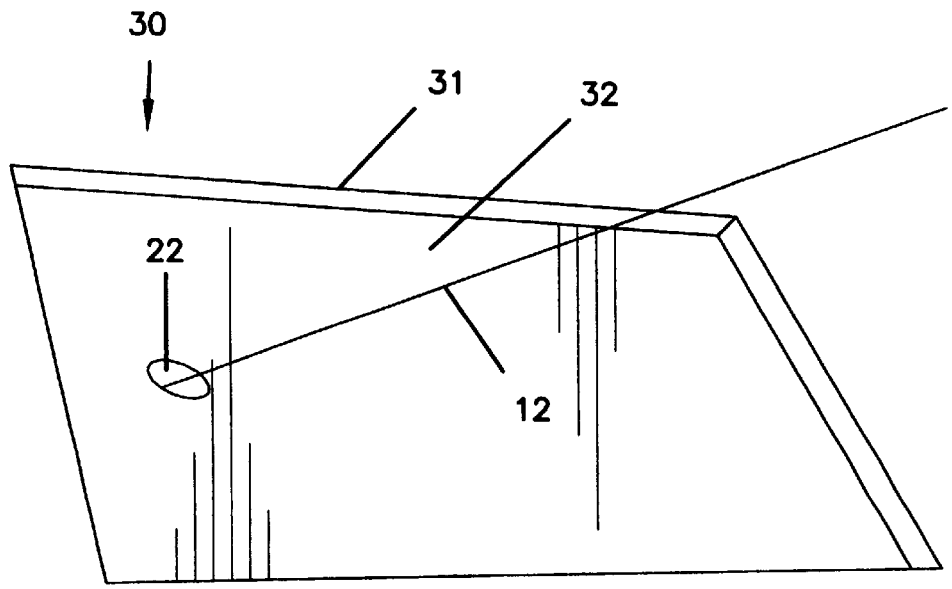
FIG. 3A is a top perspective view of a cable passing through the pilot hole of FIG. 3.
Figure 4:
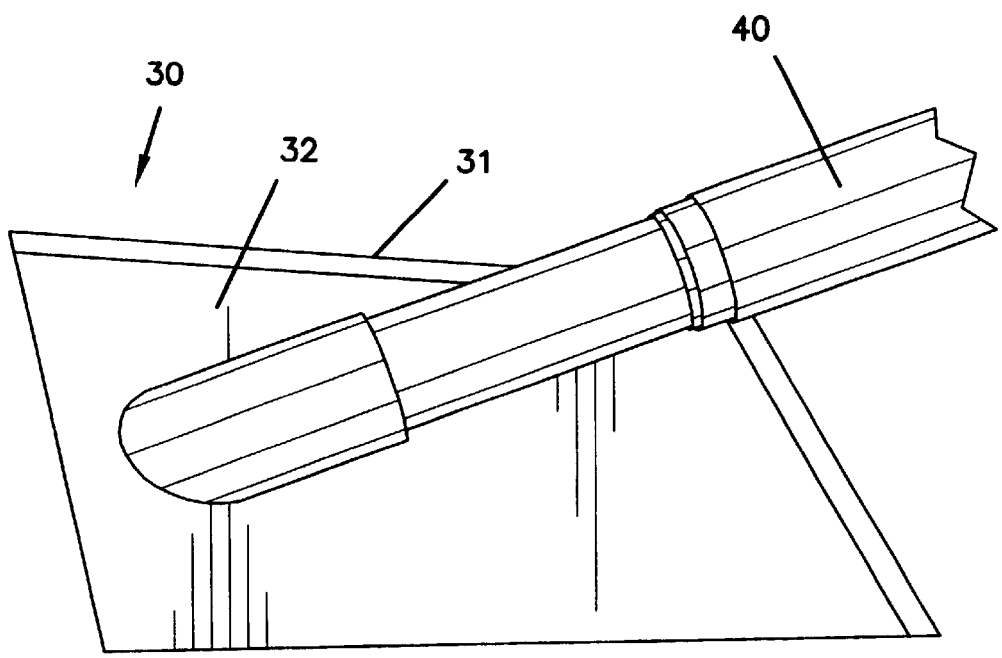
FIG. 4 is a top perspective view of a ramming or piercing tool including replacement pipe passing through the pilot hole of FIG. 3.

Referring now to FIGS. 2–6 in which like elements are numbered alike, the present invention is shown. A portion of pipe 16 which needs repair or replacement is located between two manholes 18 and 19. With particular reference to FIGS. 2 and 3, a piercing tool 20 operates to form a pilot hole 22. In the preferred embodiment, piercing tool 20 may be placed into manhole 18 and directed diagonally upward toward surface 30. Piercing tool 20 will break through any asphalt or concrete 31 on surface 30. As illustrated in FIG. 3 and 3A, if surface 30 is paved with asphalt or concrete 31 it is preferred to cut a portion 32 of concrete 31 away to facilitate entry of a ramming tool 10 including replacement pipe 40 into pilot hole 22 and existing pipe 16.

Figure 5:
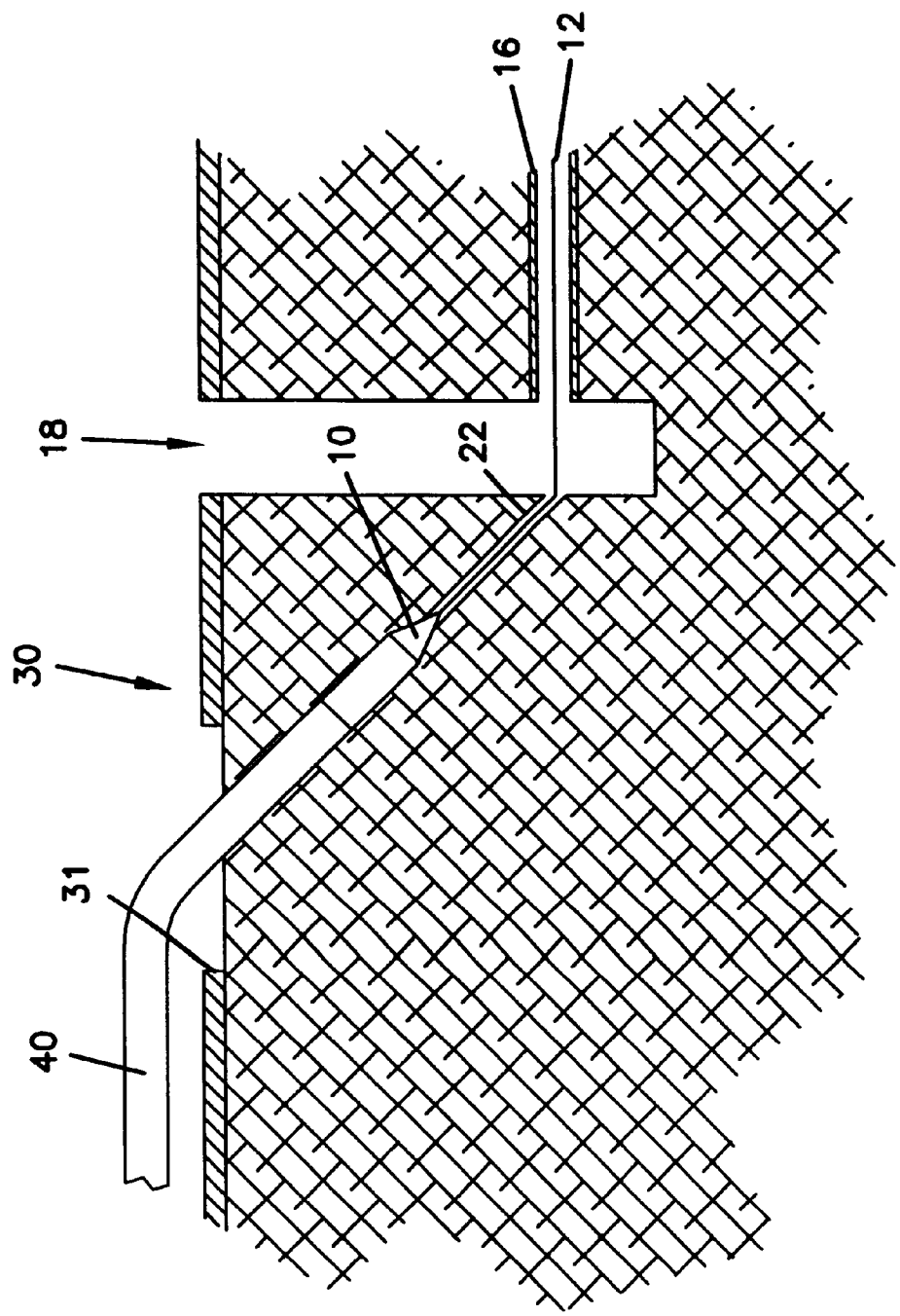
FIG. 5 is a side view of the method of the present invention specifically illustrating a ramming or piercing tool passing through the pilot hole with the soil shown in section.
Figure 6:
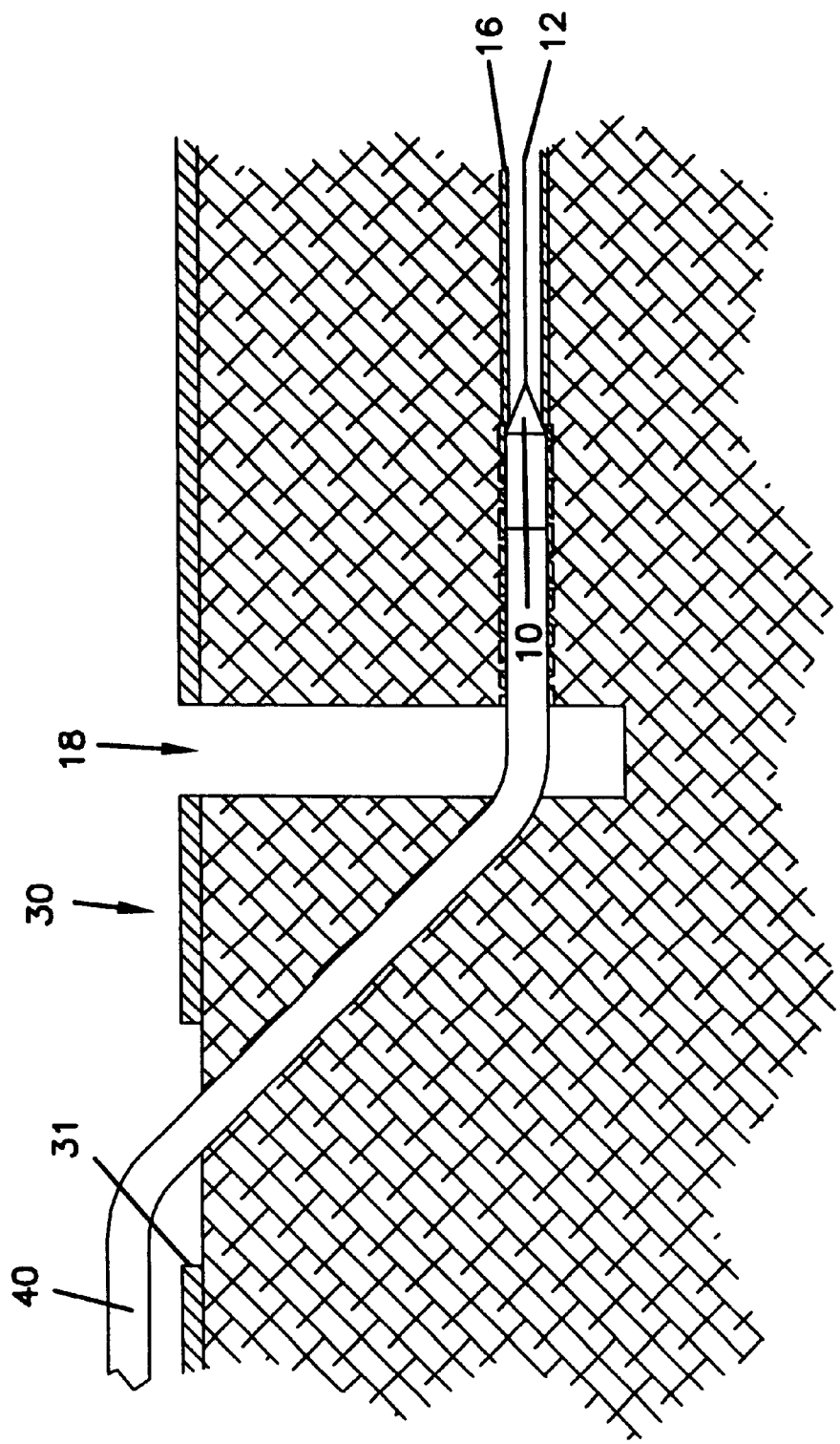
FIG. 6 is a side view of the method of the present invention illustrating the ramming tool of FIG. 5 positioned within the existing underground pipe with the soil shown in section.

As illustrated in FIGS. 3A and 5 a guide cable 12 passes from manhole 19, through existing pipe 16 and out pilot hole 22. Guide cable 12 includes a distal end 51 and a proximal end 52. Distal end 51 of guide cable 50 is attached to ramming tool 10, and proximal end 52 of guide cable 50 is attached to a winch 54 positioned on surface 30 adjacent manhole 19.

A pair of guides 55 and 56 are positioned within manhole 19. Guides 55 and 56 facilitate the passing proximal end 52 of cable 12 to winch 54. Guides 55 and 56 may be supported by a support post 58 positioned within manhole 19. In some installations, the need for guides 55 and 56, as well as support post 58 are not required. Further, an adjustable winch boom assembly (not separately shown), may be used in place of support post 58.

As best illustrated in FIGS. 3 and 4–6 after ramming tool 10 is attached to guide cable 12, ramming tool 10 is passed through pilot hole 22. Ramming tool 10 operates in a similar fashion to the devices described in U.S. Pat. No. 4,789,268 to Yarnell and/or U.S. Pat. No. 4,738,565 to Streatfield (the disclosures and drawings of which are herein incorporated by reference) or otherwise to fracture and displace the existing pipe. In the case of slip lining, no breakage of the existing pipe is required.

For pipeline replacement, the ramming tool 10 may be hydraulically or pneumatically operated and breaks existing pipe 16 into the surrounding soil. A plastic pipe 40 trails behind ramming tool 10. Many known types of suitable plastic pipe exist, such as polyethylene, polypropylene and polyvinyl chloride. When ramming tool 10 passes from manhole 18 through to manhole 19, the plastic pipe 40 is removed from its spool 41 and is in the place of existing pipe 16. Both existing pipe 16 and plastic pipe 40 include associated longitudinal axes. Ramming tool 10 and guide cable 12 operate to place pipe 40 in place of pipe 16 so that the longitudinal axis of pipe 40 is in substantially the same location as that of existing pipe 16.

Depending on the size of the ramming tool 10, the plastic pipe may be of the same capacity or greater capacity than that of existing pipe 16. Further, the ramming tool may merely drag pipe 40 into existing pipe 16 such than existing pipe 16 is lined with pipe 40.

After ramming tool 10 reaches manhole 19, ramming tool 10 can be separated from pipe 40. Ramming tool 10, as well as guides 55 and 56 and support post 58 may be removed from manhole 19. Pipe 40 may then be cut at manhole 18 to completely replace existing pipe 16. After plastic pipe 40 is cut, a portion of plastic pipe 40 will still be in pilot hole 22. This plastic pipe 40 may then be removed from pilot hole 22. Pilot hole 22 may then be filled with soil, grout, etc. and any pavement cutout portion 32 may be resurfaced with either asphalt or concrete or other suitable paving material.

In unstable soils in may be necessary provide a sleeve (not shown) to assist in the placement of the new pipe. The sleeve operates to keep the unstable soil from collapsing. The present invention may be also used in combination with use of sleeve. If such is the case the sleeve, like the remaining pipe 40 in the pilot hole, may be removed or left in place.

Turning now to FIG. 7, an alternative method of practicing the invention is shown. Since pipeline refurbishment normally takes place from manhole to manhole, the pipeline to be replaced generally has a well-defined starting point and ending point. In certain applications it may prove difficult or inconvenient to remove the ramming tool from the exit manhole due to space considerations. In order to allow the replaced pipe to remain generally coaxial with the existing pipe to be replaced, it may prove advantageous to also provide an exiting pilot hole as shown. That is in certain applications the diameter of the pipe 40 and ramming tool 10 may be greater than that of the manhole. Some applications may require that guide cable 12 be set at manhole 20 and then reset at exit pilot hole. The process of moving the guide cable winch may be advantageous when slip lining the pipe.

In such installations, two pilot holes 22 and 60 would be made and the wench cable 12 would be installed through both pilot holes and the existing pipe before attachment to the ramming tool. When ramming tool 10 completes its journey and exits to ground level through exit pilot hole 60, it can be easily removed. The new pipe 40 is then cut at both the launching and ending manholes and the surplus plastic pipe within the pilot holes can be removed or left in place after it is cut down to below ground level. Any necessary cutout portions 32 at the entry and exit positions can be repaired to complete the process.

Figure 1:
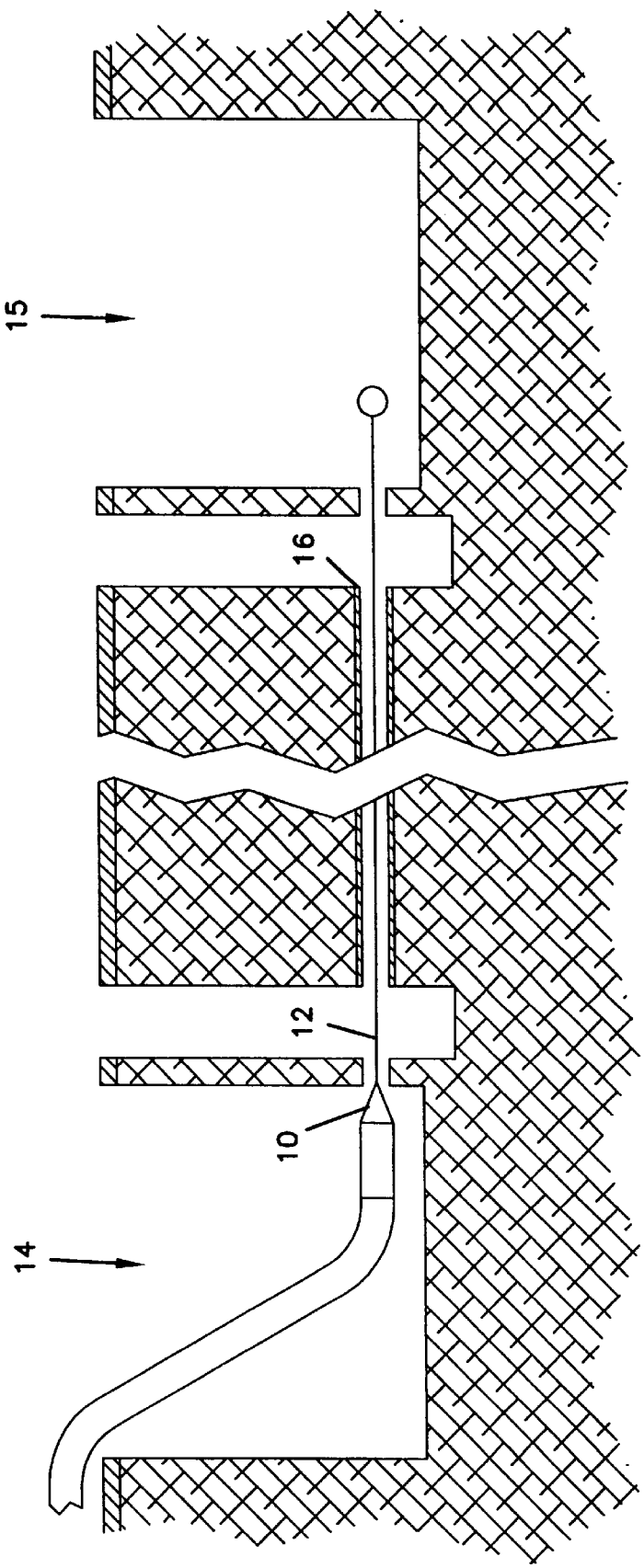
FIG. 1 is a side view of the method of pipe replacement according to the prior art showing the soil in section.

The present invention has the significant advantage of eliminating the need for the trenches illustrated in FIG. 1 and commonly used in the prior art. Eliminating the trenches saves significant time, as no time is wasted in digging or filling the trenches. Because the above method decreases the time to replace pipe, any interference the process may cause to the surrounding community is minimized. The elimination of the trenches also decreases the harm to the road surface caused by the two trench method of the prior art as settling of the soil in the trenches over time may require additional roadway repair. As no trenches are needed, only minimal surface repair is required and follow-up roadway repair is reduced or eliminated.

While the foregoing detailed description of the present invention describes the invention of the preferred embodiments, it will be appreciated that it is the intent of the invention to include all modifications and equivalent designs. Accordingly, the scope of the present invention is intended to be limited only by the claims which are appended hereto.

What is claimed:

1. A method of replacing existing underground pipe, said existing pipe including a lumen and an associated longitudinal axis, said existing pipe being surrounded by soil, said method comprising the steps of:

forming a diagonal pilot hole between said existing pipe and a upper ground surface, and;

forcing a ramming tool through said pilot hole and said existing pipe, said ramming tool operative in placing a new pipe having an associated longitudinal axis so that said associated longitudinal axis of said new pipe is substantially the same as said longitudinal axis of said existing pipe.

2. A method as in claim 1 wherein said ramming tool bursts said existing pipe into said surrounding soil, and said new pipe is placed adjacent to said surrounding soil.

3. A method as in claim 1 further comprising the steps of:
passing a guide cable having a proximal end and a distal end through said existing pipe and pilot hole, where said proximal end of said cable is attached to a winch, and said distal end of said cable attaches to said ramming tool, said guide cable operative in guiding said ramming tool through said existing pipe.

4. A method of claim 3 wherein said pilot hole is positioned upstream from said existing pipe.

5. A method of replacing existing underground pipe, said existing pipe including a lumen and being surrounded by soil, said method comprising the steps of:
forming an entry pilot hole with a piercing tool, said pilot hole positioned upstream of said existing pipe, and;
drawing new pipe through said pilot hole and said existing pipe with a ramming tool.

6. A method as in claim 5 wherein said pipe is drawn through said existing pipe with a hydraulic ramming tool having an expandable collar.

7. A method as in claim 6 further comprising the step of:
passing a guide cable through said entry pilot hole, said guide cable including a proximal end and a distal end, said proximal end attached to a winch, and said distal end attached to said ramming tool.

8. A method as in claim 7 wherein said guide cable further passes through a manhole downstream from said existing pipe, said method further comprising the step of removing said ramming tool from said manhole.

9. A method as in claim 5 further comprising the steps of forming an exit pilot hole downstream from said existing pipe and removing said ramming tool through said exit pilot hole.

* * * * *